(12) United States Patent
George et al.

(10) Patent No.: US 9,504,274 B2
(45) Date of Patent: Nov. 29, 2016

(54) METHODS OF FLAVOR ENCAPSULATION AND MATRIX-ASSISTED CONCENTRATION OF AQUEOUS FOODS AND PRODUCTS PRODUCED THEREFROM

(75) Inventors: Eapen George, Frisco, TX (US); Peter S Given, Jr., Ridgefield, CT (US); Julie Anne Grover, Plano, TX (US); Lia Guardiola, Urbana, IL (US); Graciela Wild Padua, Champaign, IL (US)

(73) Assignees: Frito-Lay North America, Inc., Plano, TX (US); The Board of Trustees of the University of Illinois, a body corporate and politic of the State of Illinois, Urbana, IL (US)

( * ) Notice: Subject to any disclaimer, the term of this patent is extended or adjusted under 35 U.S.C. 154(b) by 966 days.

(21) Appl. No.: 13/085,088

(22) Filed: Apr. 12, 2011

(65) Prior Publication Data
US 2011/0189353 A1  Aug. 4, 2011

Related U.S. Application Data

(63) Continuation-in-part of application No. 12/360,387, filed on Jan. 27, 2009.

(51) Int. Cl.
*A23L 1/025* (2006.01)
*A23L 3/00* (2006.01)
(Continued)

(52) U.S. Cl.
CPC ........ *A23L 1/22016* (2013.01); *A23V 2002/00* (2013.01)

(58) Field of Classification Search
CPC .................................... A23L 1/22016
USPC .................. 426/534, 96, 650, 238
See application file for complete search history.

(56) References Cited

U.S. PATENT DOCUMENTS 3,116,206 A   12/1963   Bryako et al.
3,535,305 A   10/1970   Carter et al.
(Continued)

FOREIGN PATENT DOCUMENTS

EP   0024297   3/1981
EP   0320523   6/1989
(Continued)

OTHER PUBLICATIONS

Fu et al. "Zein: Properties, Preparations, and Applications" Food Sci. Biotechnol. vol. 8 (1999) No. 1, pp. 1-10.
(Continued)

*Primary Examiner* — Lien T Tran
*Assistant Examiner* — Tynesha McClain-Coleman
(74) *Attorney, Agent, or Firm* — Colin P. Cahoon; Celina M. Orr; Carstens & Cahoon, LLP

(57) ABSTRACT

Flavor encapsulation is generally performed by mixing flavor with a prolamin solution and drying the mixture into powdered forms of encapsulated flavor. In one embodiment, flavor and zein are separately dispersed in an alcohol-water mixture of appropriate ratio prior to mixing. In another embodiment, an aqueous food comprising bioactive components is mixed with the prolamin solution, thereby initiating precipitation of the prolamin and concentration of the bioactive components in said aqueous food. Resulting powdered forms of encapsulated flavor comprise the bioactive components from the aqueous food. In another embodiment, a two-phase drying process may be employed comprising removal of alcohol for evaporation-induced-self-assembly of zein microstructures, followed by removal of remaining water to produce said powdered form.

13 Claims, 6 Drawing Sheets

(51) Int. Cl.
 A23L 3/30 (2006.01)
 A23C 3/00 (2006.01)
 A21D 6/00 (2006.01)
 A23L 1/216 (2006.01)
 A23L 1/22 (2006.01)
 A23L 2/56 (2006.01)
 A23L 1/221 (2006.01)

(56) References Cited

U.S. PATENT DOCUMENTS

| | | |
|---|---|---|
| 3,645,911 A | 2/1972 | van Besauw et al. |
| 3,840,676 A | 10/1974 | Yamamoto et al. |
| 3,939,259 A | 2/1976 | Pescetti |
| 3,957,964 A | 5/1976 | Grimm, III |
| 4,187,194 A | 2/1980 | Wellman et al. |
| 4,230,687 A | 10/1980 | Sair et al. |
| 4,277,364 A | 7/1981 | Shasha et al. |
| 4,384,004 A | 5/1983 | Cea et al. |
| 4,386,106 A | 5/1983 | Merritt et al. |
| 4,492,720 A | 1/1985 | Mosier |
| 4,515,769 A | 5/1985 | Merritt et al. |
| 4,863,745 A | 9/1989 | Zibell |
| 4,898,734 A | 2/1990 | Mathiowitz et al. |
| 4,919,941 A | 4/1990 | Zibell |
| 4,931,295 A | 6/1990 | Courtright et al. |
| 4,940,588 A | 7/1990 | Sparks et al. |
| 5,021,248 A | 6/1991 | Stark et al. |
| 5,098,718 A | 3/1992 | Ardaillon et al. |
| 5,145,702 A | 9/1992 | Stark et al. |
| 5,160,742 A | 11/1992 | Mazer et al. |
| 5,164,210 A | 11/1992 | Campbell et al. |
| 5,182,130 A | 1/1993 | Haralampu et al. |
| 5,266,335 A | 11/1993 | Cherukuri et al. |
| 5,271,961 A | 12/1993 | Mathiowitz et al. |
| 5,330,778 A | 7/1994 | Stark et al. |
| 5,418,010 A | 5/1995 | Janda et al. |
| 5,458,890 A | 10/1995 | Williford et al. |
| 5,545,414 A | 8/1996 | Behr et al. |
| 5,580,959 A | 12/1996 | Cook et al. |
| 5,599,556 A | 2/1997 | Meyer et al. |
| 5,609,909 A | 3/1997 | Meyer et al. |
| 5,629,035 A | 5/1997 | Miskewitz |
| 5,776,490 A | 7/1998 | Chu et al. |
| 5,993,856 A | 11/1999 | Ragavan et al. |
| 6,080,432 A | 6/2000 | Tyrpin et al. |
| 6,143,211 A | 11/2000 | Mathiowitz et al. |
| 6,165,516 A | 12/2000 | Gudas et al. |
| 6,190,591 B1 | 2/2001 | Van Lengerich |
| 6,235,224 B1 | 5/2001 | Mathiowitz et al. |
| 6,616,869 B2 | 9/2003 | Mathiowitz et al. |
| 6,635,206 B1 | 10/2003 | Padua et al. |
| 6,692,778 B2 | 2/2004 | Yatka et al. |
| 6,723,683 B2 | 4/2004 | Crossman et al. |
| 6,858,238 B2 | 2/2005 | Lee et al. |
| 7,029,700 B2 | 4/2006 | Mathiowitz et al. |
| 7,045,607 B2 | 5/2006 | Cheryan |
| 2001/0042932 A1 | 11/2001 | Mathiowitz et al. |
| 2003/0032562 A1 | 2/2003 | Crossman et al. |
| 2003/0175403 A1 | 9/2003 | Gurin |
| 2003/0180414 A1 | 9/2003 | Gudas et al. |
| 2004/0028622 A1 | 2/2004 | Gurin |
| 2004/0070093 A1 | 4/2004 | Mathiowitz et al. |
| 2004/0086595 A1 | 5/2004 | Liu et al. |
| 2004/0146599 A1 | 7/2004 | Andersen |
| 2005/0042341 A1 | 2/2005 | Thomas et al. |
| 2005/0147663 A1 | 7/2005 | Mohan et al. |
| 2006/0147494 A1 | 7/2006 | Barzilay |
| 2006/0263474 A1 | 11/2006 | Luo |
| 2006/0286214 A1 | 12/2006 | Weiss et al. |
| 2007/0053990 A1 | 3/2007 | Persyn et al. |
| 2007/0059340 A1 | 3/2007 | Bello |
| 2007/0190213 A1 | 8/2007 | Harden et al. |
| 2007/0207174 A1 | 9/2007 | Pluyter et al. |
| 2008/0057115 A1 | 3/2008 | Okamoto et al. |
| 2008/0063747 A1 | 3/2008 | Boghani et al. |
| 2009/0047434 A1 | 2/2009 | Trophardy |
| 2009/0280211 A1 | 11/2009 | Friedman et al. |
| 2010/0158984 A1 | 6/2010 | Qvyjt |
| 2010/0172998 A1 | 7/2010 | Mathiowitz et al. |
| 2010/0189845 A1 | 7/2010 | Grover et al. |
| 2010/0196543 A1 | 8/2010 | Rivera et al. |
| 2010/0196549 A1 | 8/2010 | Rivera et al. |
| 2010/0196554 A1 | 8/2010 | Rivera et al. |
| 2010/0196577 A1 | 8/2010 | Rivera et al. |
| 2010/0197568 A1 | 8/2010 | Heittiarachchy et al. |

FOREIGN PATENT DOCUMENTS

| | | |
|---|---|---|
| EP | 1830661 | 6/2006 |
| JP | 57141273 | 1/1982 |
| JP | H01181748 A | 7/1989 |
| JP | H02138951 A | 5/1990 |
| JP | 05229815 | 9/1993 |
| JP | 09009939 | 1/1997 |
| JP | 09111282 | 4/1997 |
| JP | H105123141 A | 11/1998 |
| JP | 0020999 | 1/2000 |
| JP | 2001204405 | 7/2001 |
| JP | 2002171937 | 6/2002 |
| JP | 4502102 B2 | 11/2002 |
| JP | 2002320454 A | 11/2002 |
| JP | 2004290195 | 10/2004 |
| JP | 2007507527 A | 3/2007 |
| JP | 2008093657 | 4/2008 |
| JP | 4228035 B2 | 2/2009 |
| WO | 8905589 A1 | 6/1989 |
| WO | 9803076 | 1/1998 |
| WO | 0119345 | 3/2001 |
| WO | 2007030718 | 3/2007 |
| WO | WO 2008074072 A1 * | 6/2008 |
| WO | 2008085997 A2 | 7/2008 |
| WO | 2009080032 | 7/2009 |
| WO | 2009080033 | 7/2009 |
| WO | 2010025724 | 3/2010 |

OTHER PUBLICATIONS

Guo et al. "Nano-Structure and Properties of Maize Zein Studied by Atomic Force Microscopy" Journal of Cereal Science vol. 41 (2005) pp. 277-281.
Kleen et al. "Stabilization of Lipids in a Biodegradeable Zein-Oleate Film by Incorporation of Antioxidants" Cereal Chem. vol. 79 (2002) No. 5, pp. 687-694.
Lower, Edgar S. "Zein of the Times" Protein Chemistry, Specialty Chemicals, pp. 36-40, located at http://www.dmg.couk/specchem.
Massaldi et al. "Retention of D-Limonene During Freeze Drying of Orange Juice" Journal of Food Science, vol. 39 (1974) pp. 445-448.
McGowan et al. "Comparison of Methods to Analyze Time-Intensity Curves in a Corn Zein Chewing Gum Study" Science Direct Food Quality and Preferences vol. 17 (2006) pp. 296-306.
Momany et al. "Structural Characterizations of α-Zein" J. Agric. Food Chem. vol. 54 (2006) pp. 543-547.
Moy, James H. "Vacuum-Puff Freeze Drying of Tropical Fruit Juices" Journal of Food Science, vol. 36 (1971) pp. 906-910.
Parris et al. "Encapsulation of Essential Oils in Zein Nanospherical Particles" J. Agric. Food Chem. vol. 53 (2005) pp. 4788-4792.
Wang et al. "Effect of Hydrophilic and Lipophilic Compounds on Zein Microstuctures" Food Biophysics vol. 3 (2008) pp. 174-181.
Wang et al. "Properties of Zein Films Coated with Drying Oils" J. Agric. Food Chem. vol. 53 (2005) pp. 3444-3448.
Wang et al. "Water Barrier Properties of Zein-Oleic Acid Films" Cereal Chem. vol. 83 (2006) No. 4, pp. 331-334.
Wang et al. "Water Sorption Properties of Extruded Zein Films" J. Agric. Food Chem. vol. 52 (2004) pp. 3100-3105.
Wang et al. "Zein Dynamic Adsorption to Carboxylic and Alkyl Coated Surfaces" J. Agric. Food Chem. vol. 54 (2006) pp. 517-522.
Padua et al. "Controlled self-organization of zein nanostructures for encapsulation of food ingredients" Zein-encapsulation ACS book

(56) References Cited

OTHER PUBLICATIONS chapter, Department of Food Science and Human Nutrition, University of Illinois Mar. 2009.

Lawton, John W., "Zein: A History of Processing and Use", Cereal Chem., vol. 79, No. 1, 2002, pp. 1-18.

Gharsallaoui, Adem, et al., "Applications of Spray-Drying in Microencapsulation of Food Ingredients: An Overview", Science Direct, Food Research Int'l., vol. 40, 2007, pp. 1107-1121.

Madene, Atmane et al., "Flavour Encapsulation and Controlled Release—a Review", Int'l Journal of Food Science and Technology, vol. 41, 2006, pp. 1-21.

Fernandez, Avelina, "Novel Route to Stabilization of Bioactive Antioxidants by Encapsulation in Electrospun Fibers of Zein Prolamine", Food Hydrocolloids, vol. 23, 2009, pp. 1427-1432.

Parris N., et al., "Encapsulation of Essential Oils in Zein Nanospherical Particles" Journal of Agricultural Food chemistry, 2005, 53, pp. 4788-4792.

Spray Drying, "Spray Drying and Spray Dryers," Mar. 2000, retrieved from the Internet: http://web.archive.org/web/200000301152414/http://class.fst.ohio-state.edu/Dairy-Tech/14Spraydrying.htm.

EP Search Report for EP12770865.9 mailed Apr. 24, 2015 (6 pages).

* cited by examiner

Sensory Scale

Sample # _____     Panelist (initials) _____

Fresh lime flavor intensity

None                                                                                            Intense
--+---------+---------+---------+---------+---------↕---------+---------+--
                                                            *Lime (70% juice)*

Synthetic lime flavor intensity

None                                                                                            Intense
--+---------+---------+---------+---↕-----+---------+---------+---------+--
                                        *Citral*

Sour flavor intensity

None                                                                                            Intense
--+---------+---------+---------+---------↕---------+---------+---------+--
                                              *Standard*

Bitter flavor intensity

None                                                                                            Intense
--+---------+---------+---------+--↕------+---------+---------+---------+--
                                        *Standard*

Astringent lime flavor intensity

None                                                                                            Intense
--+---------+---------+---------+--↕------+---------+---------+---------+--
                                        *Standard*

*FIG. 7*

METHODS OF FLAVOR ENCAPSULATION AND MATRIX-ASSISTED CONCENTRATION OF AQUEOUS FOODS AND PRODUCTS PRODUCED THEREFROM

CROSS-REFERENCE TO RELATED APPLICATION

This application is a continuation-in-part of and claims filing priority rights with respect to U.S. patent application Ser. No. 12/360,387, filed on Jan. 27, 2009, now abandoned, the technical disclosure of which is incorporated herein by reference.

BACKGROUND OF THE INVENTION

1. Technical Field

The present invention generally relates to a method for the encapsulation and delivery of bioactive components using a protein to extract and retain the flavor. In particular, the water insoluble properties of a prolamin can be used to extract, concentrate and deliver the non-water components of an aqueous food derived from a natural source.

2. Description of Related Art

Flavors can be important in any food formula and can influence the finished product quality and cost. It is important to harness flavors and aromas to make products appealing to consumers for as long as possible after the product is initially produced. However, the complex systems associated with flavors are often difficult and expensive to control. For example many flavors contain top notes that are quite volatile, vaporizing at or below room temperature. These top notes are often what give foods their fresh flavors. Consequently, because aroma and flavorings are usually delicate and volatile, their retention remains an ongoing concern for food manufacturers. Manufacturing and storage processes, packaging materials and ingredients in foods often cause modifications in overall flavor by reducing aroma compound intensity or producing off-flavor components. In addition, once a product is on the store shelf, oxidation, hydrolysis, staling, and other processes may also cause it to lose its desired attributes and develop off-flavors.

To limit aroma degradation during processing and storage and retain aroma and flavor of a food product, it is beneficial to encapsulate the volatile flavor ingredients prior to use in foods or beverages. Encapsulation is the technique by which one material or a mixture of materials (known as active or core material) is coated with or entrapped within another material or system (referred to as shell, wall material, matrix, carrier or encapsulant). Different processes are used for encapsulation so as to impart some degree of protection against evaporation, reaction, or migration in a food. Encapsulation of flavors has been attempted and commercialized using many different methods, often dependent upon the end use of the product, the physical and chemical properties of the core material, the degree of stability required during storage and processing, the maximum obtainable flavor load, and the production cost. Further, the ratio of the core material flavor to wall material will affect the anti-oxidative stability of an encapsulated flavor.

Spray drying is a commercial encapsulation process often used in the food and pharmaceutical industries. The process involves the dispersion of the substance to be encapsulated in a carrier material, which is typically a modified starch, as a suspension in water to form a slurry. The slurry is then fed into a hot chamber, where it is atomized to form small droplets and dried to a powder. This technology produces a very fine powder. Table 1 outlines the advantages and disadvantages of the spray-drying technique.

TABLE 1

Advantages and Disadvantages of Spray-Drying.

| Advantages | Disadvantages |
|---|---|
| Low operating cost | Produce no uniform microcapsules |
| High quality of capsules in good yield | Limitation in the choice of wall material |
| Rapid solubility of the capsules | (low viscosity at relatively high concentrations) |
| Small size | |
| High stability capsules | Produce very fine powder which needs further processing |
| | Not good for heat-sensitive material |

In particular, it should be noted that heat-sensitive materials such as the volatile components of flavorings are often lost or degraded during spray-draying. Often times, even trace components can have an important impact on the smell and/or taste of a flavor, and any loss of these volatiles can affect the authenticity of a flavor.

Table 2 illustrates several of the different major materials currently used with spray drying techniques and their desired characteristics for encapsulating flavors. The materials listed are not an exhaustive list. Many encapsulations are actually composite formulations of any or all of the compounds listed.

TABLE 2

Wall materials typically used in flavor encapsulations.

| Wall Material | Characteristics |
|---|---|
| Maltodextrin (DE < 20) | Film forming |
| Corn syrup solid (DE > 20) | Film forming, reductability |
| Modified starch | Very good emulsifier |
| Gum Arabic | Emulsifier, film forming |
| Modified cellulose | Film forming |
| Gelatin | Emulsifier, film forming |
| Cyclodextrin | Encapsulant, emulsifier |
| Lecithin | Emulsifier |
| Whey protein | Good emulsifier |
| Hydrogenated fat | Barrier to oxygen and water |

In recent years, there has been a trend towards clean label formulations and labels, or natural foods. Some consumers desire products free of preservatives and artificial ingredients and prefer to consume products developed with natural ingredients. Prolamins are an example of a potential replacement for artificial ingredients presently used in the art. Prolamins are a group of plant storage proteins, high in proline content and found in the seeds of cereal grains. They are characterized by their solubilities in aqueous alcohol and by the fact that upon hydrolysis they yield a relatively large amount of amide nitrogen and proline, a cyclic, nonpolar amino acid. Gliadin is a prolamin protein from wheat, hordein is a prolamin protein from barley, secalin is a prolamin protein from rye, and zein is a prolamin protein from the maize kernel or corn.

Zein is one of the few cereal proteins extracted in a relatively pure form and is a natural, biodegradable polymeric material. Zein is an odorless, amorphous powder rich in branched amino acids. It constitutes 44-79% of the corn endosperm protein, depending on the corn variety and separation method used. The only known function of zein in nature is to act as storage for nitrogen in the developing seed of the maize kernel. Unlike most other commercially available proteins, it has unique thermoplastic and hydrophobic properties. It has a unique ability to form odorless, tasteless, clear, tough films and fibers that are highly resistant to water and grease.

In light of the trend towards "clean label" foods and the complexities of flavorings, a need exists for a method of utilizing more natural compounds for encapsulating flavors to reduce or substantially eliminate artificial or modified ingredients. Moreover, there is a need for further methods that utilize natural proteins such as zein to protect sensitive materials such as flavors from degradation or loss. There is also a need for an encapsulation method that provides for the retention of costly or complicated flavoring ingredients without masking or dampening of flavoring, while providing high flavor loading and maintaining shelf-life. In addition, there is a need for methods of encapsulating well-liked natural flavors in a way that maintains and preserves substantially all its flavorants and tastants so as to produce authentic natural flavors. Such a method would preferably provide for the extraction, concentration and delivery of flavor in a suitable matrix within one simple and cost-effective process and substantially within one step. Finally, there is a need for methods capable of concentrating and encapsulating not only flavors, but also the other bioactive components of a food.

SUMMARY OF THE INVENTION

The present invention provides methods for the encapsulation of flavoring using at least one prolamin to reduce or eliminate the need for artificial or modified ingredients that are commonly used to protect flavorings from loss or degradation. Unless otherwise specified, the term "encapsulation" is used herein to mean both a process in which the whole surface of a core particle is covered with a coating composition containing a prolamin as well as partially covered or entrapped within a matrix of said composition. Methods for encapsulation of flavors generally comprise the steps of dissolving a prolamin in an appropriate solvent to form a prolamin solution, mixing a flavoring with the prolamin solution and drying the mixed solution to form a powder comprising prolamin-encapsulated flavoring.

In a first aspect, the present invention relates to the encapsulation of flavors wherein the flavor is first dissolved in an alcohol solution prior to mixing with the prolamin solution. Separate dissolving of an oil- or water-based flavor and the prolamin in solvents may be followed by sonication before drying steps. In a second aspect, the present invention relates to the incorporation of an aqueous food comprising bioactive components, wherein said bioactive components comprise flavoring. The aqueous food comprising the flavor is mixed with a prolamin solution, thereby providing a slow forming precipitate and matrix-assisted concentration of the aqueous food. In a third aspect, the present invention relates to drying the mixed solution using a two-phase drying process, which promotes formation of said powder-form encapsulated flavoring.

Further objects and advantages of the present invention will be clear from the description that follows. All percentages herein are by weight unless otherwise recited.

BRIEF DESCRIPTION OF THE DRAWINGS

The novel features believed characteristic of the invention are set forth in the appended claims. The invention, itself, however, as well as a preferred mode of use, further objectives and advantages thereof, will be best understood by reference to the following details description of illustrative embodiments when read in conjunction with the accompanying drawings, wherein:

FIG. 7 depicts a sample sensory scale used in a panel sensory evaluation of flavors of products produced by three different processes.

DETAILED DESCRIPTION OF THE PREFERRED EMBODIMENTS

Figure 1:
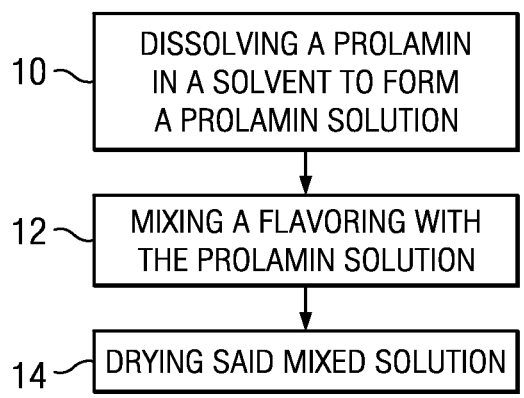
FIG. 1 depicts a flowchart of an overall method according to the parent application of the present invention.

Flavoring foods involves complicated processing. In particular, natural flavors are often derived from more-expensive, and sometimes less-available, raw materials and processes. Protecting the delicate and trace components of flavors is often difficult, as volatiles can degrade or evaporate upon contact with heat or even room temperatures. Encapsulation is important to the preservation and authenticity of heat-sensitive materials. A limited number of encapsulating methods exist but a wide range of different materials can be used, including proteins, carbohydrates, lipids, gums and cellulose. The choice of encapsulation materials depends upon a number of factors including: expected product objectives and requirements; nature of the core material; the process of encapsulation; and economics. In the present invention, a method for encapsulation of flavors with a prolamin provides a natural alternative for consumers, having little to no artificial or modified ingredients. Prolamins are seed storage proteins found in many cereal grains including without limitation maize, sorghum, millets, wheats, and ryes. They are known as such because they tend to have high levels of the amino acids proline and glutamine. The zein prolamin exists as mixtures of alpha, beta, delta, and gamma forms and is readily commercially available.

Zein is soluble in binary solvents exhibiting both polar and non-polar characteristics and containing a lower aliphatic alcohol and water, such as aqueous ethanol and aqueous isopropanol; however it is also soluble in a variety of other organic solvents. Tables 3, 4 and 5 list solvents for zein found in a zein review by John W. Lawton in the Cereal Chemistry Journal, Vol. 79, No. 1, 2002. Table 3 lists the primary solvents for zein, making at least a 10% (w/v) solution. The critical cloud points for each primary solvent are also listed, referring to the temperature at which dissolved solids are no longer completely soluble, precipitating as a second phase and giving the solution a cloudy appearance upon cooling. Emulsifiers can be added to stabilize the emulsion. While not all of the solvents listed in the following tables are food grade solvents suitable for use with the present invention to produce natural edible flavorings, each is capable of dissolving the zein prolamin.

TABLE 3

Primary Solvents for Zein

| Solvent | Temp. ° C. |
|---|---|
| Acetamide | 82 |
| Acetic acid | 14 |
| 2-amino-2-ethyl-1,3-propandiol | 38 |
| 2-amino-2-methyl-1-propanol | 24 |
| Aniline | Gels |
| Benzyl alcohol | −18 |
| Benzyl Cellosolve | ≤40 |
| Butylamine | ≤40 |
| Butyl tartrate | ≤40 |
| 1,3-Butylene glycol | 39 |
| o-Cyclohexylphenol | >55 |
| 1,3-Diaminopropanol | 40 |
| Di [-βhydroxyethyl]aniline | >59 |
| Diethanolamine | 30 |
| Diethylene glycol | ≤40 |
| Diethylene glycol monoethyl ether | ≤40 |
| Diethylene glycol monomethyl ether | ≤40 |
| Diethylenetriamine | 32 |
| Diglycolchlorohydrine | ≤40 |
| Diisopropanolamine | −20 |
| Dipropylene glycol | −24 |
| Ethyl ether tripropylene glycol | −25 |
| Ethyl lactate | 40 |
| Ethylphenylethanolamine | 18 |
| Ethylene chlorohydrine | ≤40 |
| Ethylene glycol | ≤40 |
| Ethylene glycol monoethyl ether | 11 |
| Ethylene glycol monomethyl ether | 7 |
| Ethylenediamine | |
| Formic acid | |
| Furfuryl alcohol | ≤40 |
| Glycerol | 139 |
| Glycerol furfuryl | ≤40 |
| Glycerol-α-γ-dimethyl ether | ≤40 |
| Glycerol-α-monochlorohydrine | ≤40 |
| Glycerol-α-methyl ether | ≤54 |
| Glycerol-α-phenyl ether | −30 |
| β-Hydroxyethyl aniline | ≤40 |
| Hydroxyethylethylenediamine | ≤40 |
| 2-Hydroxymethyl-1,3-dioxolane | ≤40 |
| | 63 |
| Lactic acid | ≤40 |
| Methanol | 6 |
| Methyl lactate | −4 |
| Monoethanolamine | −6 |
| Monoisopropanolamine | >2 |
| Morpholine | 40 |
| Morpholine ethanol | −15 |
| Phenol | 60 |
| Phenylethanolamine | −30 |
| Propionic acid | ≤40 |
| Propylene chlorohydrin | ≤40 |
| Propylenediamine | ≤40 |
| Propylene glycol | 0 |
| Pyridine | >21 |
| Resoricinol monoaceate | ≤40 |
| Triethanolamine | ≤40 |
| Triethylenetetramine | ≤40 |
| Tetrahydrofurfuryl alcohol | >46 |
| Triethylene glycol | |
| Triisopropanolamine | |

All the primary solvents are glycols, glycol-ethers, amino-alcohols, nitro-alcohols acids, amides, or amines. For a single substance to be a good solvent for zein, the molecule needs to have the proper balance between polar and nonpolar groups. Water as well as aromatic hydrocarbons are also said to improve the solvent power of anhydrous alcohols. Ketones and water mixtures can also make good binary solvents. Regardless of whether one or more substances are used to dissolve zein, for purposes of the present invention, it is preferred that zein be dissolved in a food grade solvent that is safe to ingest.

The solvating power of binary solvents depends on the ratio of the two components. Table 4 lists the solubility of zein in binary solvent systems where lower aliphatic alcohols, ketones, or glycols are the primary component and water, aromatic hydrocarbons, chlorinated hydrocarbons, nitroparafins, aldehydes, or cyclic ethers are the secondary components. In addition to aqueous solutions of acetone, isopropanol, and isobutanol are also effective solvents for zein.

TABLE 4

Secondary Solvents for Zein

| Water in combination with one of the following | A lower aliphatic alcohol and one of the following |
|---|---|
| Acetone | Acetaldehyde |
| Acetonyl acetone | Acetone |
| n-Butanol | Benzene |
| t-Butanol | Butyl lactate |
| s-Butanol | Chloroform |
| Dioxalane | Dichloromethane |
| Dioxane | Diethylene glycol monoethyl ether |
| Ethanol | Ethyl lactate |
| Isobutanol | Ethylene dichloride |
| Isopropanol | Ethylene glycol |
| Methanol | Ethylene glycol monoethyl ether |
| n-Propanol | Furfural |
| | Methyl ethyl ketone |
| | Methylene chloride |
| | Nitroethane |
| | Nitromethane |
| | Propylene glycol |
| | 1,1,2,2-Tetrachloroethane |
| | 1,2,3-Trichloroethane |
| | Toluene |

Ternary solvent mixtures utilizing water in addition to alcohol and aldehyde mixtures can also be used to dissolve zein. Table 5 lists the ternary solvents for zein.

TABLE 5

Ternary Solvents for Zein

Water, a lower aliphatic alcohol, and one of the following

Acetaldehyde
Acetone
Acetonylacetone
Benzene
Butyradehyde
Diacetone alcohol
Dioxane
Ethylene glycol monoethyl ether
Formaldehyde
Methyl acetate
Nitroethane
Nitromethane Water and any two of the following 1,3-Butanediol
1,4-Butanediol
2,3-Butanediol
Diethylene glycol
Dipropylene glycol TABLE 5-continued Ternary Solvents for Zein Ethylene glycol
Hexylene glycol
Propylene glycol One embodiment of the present invention will now be described with reference to FIG. 1. A prolamin is dissolved in a solvent capable of dissolving the prolamin, forming a prolamin solution 10. In one embodiment of the present invention, zein is selected as the prolamin for formation of a zein solution. In other embodiments, one or more prolamins may be combined so long as their solubilities are sufficiently similar. As discussed above, Tables 3-5 list a number of solvents capable of dissolving zein. It should be noted that solvents with higher boiling points such as glycols require higher temperatures for removal, which may result in increased flavor loss. Consequently, solvents with lower boiling points of no more than 100° C. are preferable in some embodiments of the present invention. For use with the present invention, it is also preferable to use food grade solvents that allow for the production of edible encapsulations including without limitation water, ethanol, propanol, butanol, isopropanol, isobutanol, acetic acid, lactic acid, acetone, ethyl acetate, benzyl alcohol, and any mixtures thereof. As used herein, the term "food grade" means that up to specified amounts of the particular compound can be ingested by a human without generally causing deleterious health effects. Examples of food grade compounds include those compounds "generally recognized as safe" ("GRAS") by the United States Food and Drug Administration ("FDA"), including those listed under 21 C.F.R. §§172, 182 and 184.

In one preferred embodiment, the prolamin is dissolved in solvents comprising aqueous ethanol solutions containing varying concentrations of ethanol and water of from between about 60% and up to about 90% ethanol and about 10% and about 40% water. Below about 60%, the aqueous ethanol solution may cause early precipitation of the prolamin, without encapsulation of subsequently added aqueous foods. In one embodiment, the solvent comprises varying concentrations of ethanol and water of from between about 70% to about 80% ethanol and about 20% to about 30% water.

The dissolving of the prolamin 10 is meant to encompass dispersing to form a solution, dispersion, or emulsion comprising a prolamin. In order to ensure a substantially complete dissolution of the prolamin in the solvent, in one embodiment, the solvent is first heated prior to the dissolving step, wherein the prolamin is dissolved in the solvent. In one embodiment, the solvent of aqueous ethanol is heated to between about 120° F. to about 130° F., followed by the addition of the prolamin. The solution should be heated slowly until it reaches at least 120° F. but not more than about 140° F. before adding the prolamin. Once the prolamin is added to the heated solvent, the mixture can be stirred until the zein is dissolved. In one embodiment, the mixture is stirred until the solution becomes clear, with substantial reduction or elimination of any cloudiness, indicating that the zein has been sufficiently dissolved or well-dispersed. In embodiments comprising heated solvent, dissolved zein solutions should be cooled before adding in or combining with any flavor to be encapsulated. In one embodiment, the solution should be cooled to at least about 100° F. before any flavoring or aqueous food is added. Cool temperatures will protect the volatiles of the flavorings or aqueous foods from high temperatures that may cause degradation. In another embodiment, the zein is dissolved using sonication methods to ensure substantially complete dissolution of the prolamin. Sonication may be used to speed dissolution, by breaking intermolecular interactions. In one embodiment, sonication is performed without heat. In some embodiments, sonication may be performed for between about 2 minutes and about 10 minutes. In one embodiment, the zein solution is sonicated for about 2 minutes. Sonication may be performed with using a sonicator, as known in the art. For example, a suitable sonicator is a VC-750 ultrasound generator manufactured by Sonics and Materials, Inc.

Viscosity causes fluids to resist agitation, preventing particle breakup and leading to larger particle sizes. Thus, the viscosity of a solution will affect the characteristics of the end product flavor encapsulations of the present invention. By way of example and without intending to limit the scope of the present invention, viscosity measurements for various prolamin solutions that were used with the present invention are shown in Table 6 below. Non-genetically modified zein refers to zein whose genetic material has not been altered using genetic engineering techniques.

TABLE 6

Viscosity Measurements for Various Zein Prolamin Solutions

| Prolamin | Solvent | Viscosity (cP) @ room temp |
| --- | --- | --- |
| 10% Zein | 90:10 EtOH:water | 11.7 |
| | 80:20 EtOH:water | 11.1 |
| | 50:50 EtOH:water | 4.5 |
| 15% Zein | 90:10 EtOH:water | 21.3 |
| | 80:20 EtOH:water | 57.9 |
| | 50:50 EtOH:water | 4.5 |
| 10% Zein non-GMO | 90:10 EtOH:water | 16.5 |
| | 80:20 EtOH:water | 68.4 |
| | 50:50 EtOH:water | 4.5 |
| 10% Zein | 90:10 IPA:water | 14.7 |
| | 80:20 IPA:water | >120 |
| 10% Zein | 100% Benzyl alcohol | 47.7 |

Table 6, above, lists various prolamin solutions used with the present invention and their measured viscosities. Results may vary due to the processing conditions and the quality of the prolamin used. In one embodiment, the viscosity of the prolamin solution used is greater than approximately 4.0 centipoise (cP). In another embodiment, the viscosity of the prolamin solution ranges from approximately 4 cP to approximately 120 cP.

In an embodiment using 10% zein dissolved in a 90:10 solution of ethanol:water, the resulting viscosity ranges from between approximately 11.5 to approximately 11.9 cP, and more preferably approximately 11.7 cP. In another embodiment using 10% zein in an 80:20 ethanol:water solution, the prolamin solution comprises a viscosity of approximately 10.9 cP to approximately 11.3 cP, and more preferably approximately 11.1 cP. In an embodiment prepared with 15% zein in a solution of 90:10 ethanol:water, the viscosity falls within approximately 21.1 cP to approximately 21.5 cP, and more preferably approximately 21.3 cP. In another embodiment using 15% zein in a 80:20 solution of ethanol:water, the prolamin solution comprises a viscosity of approximately 57.7 cP to approximately 61.1 cP, and more preferably approximately 57.9 cP. In an alternate embodiment, a 50:50 solution of ethanol:water results in a viscosity of approximately 4.5 cP. In this embodiment, centrifugation was necessary to separate out undissolved zein, resulting in lower zein concentrations. As the zein load decreased, the effective zein concentration decreased. For example, 10% zein dissolved in 50:50 ethanol:water resulted in a concentration of less than 2.5% zein, while 15% zein dissolved in the same solution resulted in less than 3.9% zein. Non-genetically modified 10% zein resulted in less than 1.1% zein concentration in the same solution. However, using different drying methods, a batch amount of encapsulated flavor can be achieved using the methods described as follows.

Returning to the discussion of FIG. 1, once the prolamin is dissolved 10, flavoring is added to the prolamin solution and mixed by mechanical stirring under high shear 12. By "high shear" it is meant that the solution is blended or mixed mechanically under high speed to thoroughly disperse or dissolve the flavor throughout the prolamin solution. As used herein, the term "flavors" is synonymous with "flavorings" and refers to flavor ingredients or flavor-containing solutions including but not limited to extracts, essential oils, essences, distillates, resins, balsams, juices, botanical extracts, flavor, fragrance, and aroma ingredients including essential oil, oleoresin, essence or extractive, protein hydrolysate, distillate, or any product of roasting, heating or enzymolysis, which contains the flavoring constituents derived from a spice, fruit or fruit juice, vegetable or vegetable juice, edible yeast, herb, bark, bud, root, leaf or similar plant material, meat, seafood, poultry, eggs, dairy products, or fermentation products thereof as well as any substance having a function of imparting flavor and/or aroma. In test runs, lime, balsamic vinegar and Parmesan cheese flavorings were encapsulated as discussed in the examples below. However, one skilled in the art, armed with this disclosure, will recognize that any number of flavorings in general can be used with the present invention. Encapsulates were produced containing flavor levels as high as 75% after drying.

The mixed flavoring and prolamin solution is dried 14 to form particles. Any number of suitable drying methods exists. By way of example, drying methods include spinning disk atomization as well as other spray drying techniques such as atomization by nozzle or rotary atomizer. Processing conditions such as drying can vary depending on a number of factors, including the viscosity, surface tension and density of the sample. Spinning disk atomization produces high quality powders in the form of narrowly dispersed or mono-sized spherical beads, in the size range of approximately 5 to 100 μm.

During spinning disk atomization, a nozzle introduces fluid at the center of a spinning disk. Centrifugal force carries the fluid to and throws the fluid off the edge of the disk. The liquid breaks down into fine droplets or microparticles, which are formed by the removal of the solvent and collected using a cyclone separator, a centrifugal separator where the particles are swung as a result of their mass by the centrifugal force to the outside. Entering air automatically forces a rapidly spinning double vortex movement, called a "double-vortex". This double vortex movement exists from the outside stream that flows spirally down and the inside stream that flows spirally up. On the border area of both flows, the air flows from one to the other. The particles present in the air flow are swung to the outside wall and leave the separator by means of a reception space situated to the base. In the examples below, a 3-inch disk was used for the atomization at a disk speed of about 8,500 rpm or about 10,000 rpm, a feed rate of between about 53 to about 65 g/min and an outlet temp of about 50-55° C. As a result, a powder of flavoring encapsulated within a prolamin matrix is achieved.

The invention will now be further elucidated with reference to the following examples, which should be understood to be non-limitative. Tables 7, 8 and 9, below, illustrate the encapsulations of a lime, Parmesan cheese, and Balsamic vinegar flavoring, respectively, using a mixture of ethanol and water in a proportion of 90:10 as the prolamin solvent. One skilled in the art would recognize that these and other flavorings are readily commercially available from any number of manufacturers.

TABLE 7

Lime flavoring zein encapsulates.

| Example | Prolamin Concentration | Flavor Loading | Temperature (° C.) | Disk speed (rpm) | Size (microns) | | |
|---|---|---|---|---|---|---|---|
| | | | | | 10% | 50% | 90% |
| 1 | 10% | 15% | 51 | 8,000 | 20 | 42 | 77 |
| 2 | 10% | 55% | 51 | 8,000 | 21 | 41 | 76 |
| 3 | 10% | 75% | 51 | 8,000 | 24 | 54 | 108 |
| 4 | 10% | 55% | 48 | 10,000 | 12 | 25 | 49 |
| 5 | 10% | 55% | 45 | 10,000 | 12 | 26 | 53 |
| 6 | 10% | 55% | 41 | 10,000 | 12 | 27 | 53 |
| 7 | 12.5% | 55% | 50 | 10,000 | 11 | 25 | 52 |
| 8 | 15% | 55% | 50 | 10,000 | 13 | 33 | 66 |

In example one of Table 7, 180 grams of a solution of 90% Ethanol and 10% water by weight was prepared and 20 grams of zein was added and dissolved to form the 10% zein solution. A load of lime oil flavoring was added to the zein solution such that the theoretical loading after drying would be 15%. Approximately 3.53 grams of lime oil was added to the zein solution to create the 15% load of lime, calculated based on 3.53 grams of lime oil divided by total of the amount of zein and flavoring added (in this example, 3.53/[20+3.53]=0.15). Consequently, "flavor loading" is calculated herein by the following formula: (amount of flavor)/(amount of flavor+amount of solids added). Returning to example one of Table 7, following the addition of flavoring, the flavoring and prolamin solution was then mixed under high shear. The mixed solution was then dried using the spinning disk atomization method wherein a 3-inch disk was used at a disk speed of about 8,000 rpm with a feed rate of about 62 g/min and at an outlet temp of about 51° C. Approximately 14.28 grams of product was collected in the cyclone separator (a 61% yield). The resulting dried powder particles had a particle size distribution of approximately 1 to 120 microns, with an average particle size of approximately 42 microns, where 10% of the measure sample was less than 20 microns, 50% was less than 42 microns and 90% was less than 77 microns.

TABLE 8

Parmesan cheese flavoring zein encapsulates using a 10% zein solution.

| Example | Flavor Loading | Temperature (° C.) | Disk speed (rpm) | Size (microns) | | |
|---|---|---|---|---|---|---|
| | | | | 10% | 50% | 90% |
| 9 | 15% | 51 | 8,000 | 27 | 49 | 87 |
| 10 | 55% | 51 | 8,000 | 34 | 58 | 98 |
| 11 | 75% | 51 | 8,000 | 46 | 75 | 120 |
| 12 | 75% | 51 | 10,000 | 30 | 47 | 76 |
| 13 | 55% | 51 | 10,000 | 23 | 37 | 62 |

In Table 8, the examples were prepared in the same way as the examples of Table 7, using a 10% zein solution. By way of example and without limiting the scope of the invention, in example 10 of Table 8, 180 grams of a solution of 90% Ethanol and 10% water by weight was prepared and 20 grams of zein was added and dissolved to form the 10% zein solution. A load of Parmesan cheese flavoring was added to the zein solution such that the theoretical loading after drying would be 55%. Approximately 24.4 grams of Parmesan cheese flavoring was added to the zein solution to create the 55% load of Parmesan cheese, calculated based on 24.4 grams of Parmesan cheese divided by total of the amount of zein and flavoring added (in this example, 24.4/[20+24.4] is about 0.55). The flavoring and prolamin solution was then mixed under high shear to form a mixed solution. The mixed solution was then dried using the spinning disk atomization method wherein a 3-inch disk was used at a disk speed of about 8,000 rpm with a feed rate of about 76/min and at an outlet temp of about 51° C. Approximately 29 grams of product was collected in the cyclone separator. The resulting dried powder particles had a particle size distribution of approximately 20 to 160 microns, where 10% of the measure sample was less than 34 microns, 50% was less than 58 microns and 90% was less than 98 microns.

TABLE 9

Balsamic flavoring zein encapsulates using a 10% zein solution.

| Example | Flavor Loading | Temperature (° C.) | Disk speed (rpm) | Size (microns) | | |
|---|---|---|---|---|---|---|
| | | | | 10% | 50% | 90% |
| 14 | 15% | 51 | 8,000 | 21 | 45 | 90 |
| 15 | 55% | 51 | 8,000 | 20 | 40 | 81 |
| 16 | 75% | 51 | 8,000 | 36 | 59 | 100 |

The examples of Table 9 were prepared in the same way as the above examples of Tables 7 and 8. By way of example and without intending to limit the scope of the invention, in example 16 of Table 9, 90 grams of a solution of 90% Ethanol and 10% water by weight was prepared and 10 grams of zein was added and dissolved to form the 10% zein solution. A load of balsamic flavoring was added to the zein solution such that the theoretical loading after drying would be 75%. Approximately 30 grams of balsamic flavoring was added to the zein solution to create the 75% load of balsamic, calculated based on 30 grams of balsamic divided by total of the amount of zein and flavoring added (in this example, 30/[10+30]=0.75). The flavoring and prolamin solution was then mixed under high shear to form a mixed solution. The mixed solution was then dried using the spinning disk atomization method wherein a 3-inch disk was used at a disk speed of about 8,000 rpm with a feed rate of about 52 g/min and at an outlet temp of about 51° C. Approximately 4.65 grams of product was collected in the cyclone separator. The resulting dried powder particles had a particle size distribution of approximately 22 to 210 microns (μm), where 10% of the measure sample was less than 36 microns, 50% was less than 59 microns and 90% was less than 100 microns.

Although the above examples provide specifics values for the concentration levels of ethanol and water, the levels of zein, ethanol, and water can be varied. By way of example and without intending to limit the scope of the invention, as seen in Table 6, 80:20 proportions of ethanol and water can also be used to dissolve the prolamin. In one test run, 360 grams of a solution of 80% Ethanol and 20% water by weight was prepared and 40 grams of zein was added and dissolved to form the 10% zein solution. A load of lime oil was added to the zein solution such that the theoretical loading after drying would be 55%. Approximately 48.8 grams of lime oil was added to the zein solution to create the 55% load of lime oil, calculated as above (based on 48.8 grams of lime flavor divided by total of the amount of zein and flavoring added (88.8 grams) for an approximate 0.55 or 55%). The flavoring and prolamin solution was then mixed under high shear to form a mixed solution. The mixed solution was then dried using the spinning disk atomization method wherein a 3-inch disk was used at a disk speed of about 8,000 rpm and at an outlet temp of about 51° C. The resulting dried powder particles had a particle size distribution of approximately 1 to 120 microns (μm) where 10% of the measure sample was less than 12 microns, 50% was less than 27 microns and 90% was less than 57 microns.

While the invention has been particularly shown and described with reference to particular embodiments, it will be understood by those skilled in the art that various changes in form and detail may be made therein without departing from the spirit and scope of the invention. For example, other ingredients common to encapsulating flavors can also be incorporated, in some embodiments, including without limitation carbohydrates, hydrocolloids, gums, emulsifiers, calcium silicate, silicon dioxide, and cellulose materials such as ethyl cellulose, and hydroxypropyl cellulose.

Figure 2:
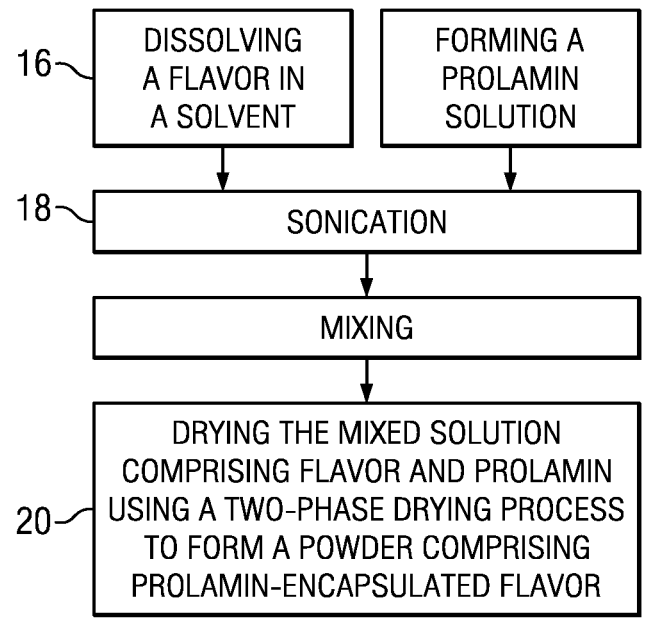
FIG. 2 depicts a flowchart of additional embodiments for flavor encapsulation according to the present invention.

FIG. 2 depicts a flow chart illustrating additional embodiments of the present invention. In one embodiment, the method of the present invention further comprises the improvement of dissolving a flavor in a solvent 16 to form a flavor containing solution. In one embodiment, said flavor may be oil-based. In another embodiment, the flavor is water-based. In one embodiment, the flavor is dissolved in an alcohol solution. In a preferred embodiment, the flavor is dissolved in a food grade alcohol solvent. In one embodiment, said solvent is an ethanolic solution. In one embodiment, the ethanol solution comprises between about 40% to about 90% ethanol, with the remaining portion comprising water. In one embodiment, dissolving comprises combining or adding the flavor with an ethanol solvent, followed by mixing until the observed two phases become one. As with the dissolving of a prolamin, dissolving of said flavor is meant to encompass dispersing to form a solution, dispersion or emulsion comprising flavor.

Separate from the step of dissolving the flavor in a solvent 16, a prolamin solution is formed, as described above with regard to reference numeral 10 in FIG. 1. Briefly, a prolamin is dissolved in a solvent capable of dissolving the prolamin, forming a prolamin solution 10. In one embodiment of the present invention, zein is selected as the prolamin for formation of a zein solution. In other embodiments, one or more prolamins may be combined so long as their solubilities are sufficiently similar. As discussed above, Tables 3-5 list a number of solvents capable of dissolving zein. In one preferred embodiment, the prolamin is dissolved in solvents comprising aqueous ethanol solutions containing varying concentrations of ethanol and water of from between about 60% and up to about 95% ethanol and about 5% and about 40% water. In one embodiment, the solvent comprises varying concentrations of ethanol and water of from between about 70% to about 80% ethanol and about 20% to about 30% water. Steps to ensure or aid complete dissolution of the prolamin may also be performed as discussed above.

Returning to the discussion of FIG. 2, the dissolving of the flavor in a solvent 16 may occur simultaneous or consecutive with formation of the prolamin solution 10 as described above, so long as dissolving steps take place prior to mixing the solutions together. Without being bound by theory, it is believed that the dissolving of flavor in a solvent assists with providing for desirably small flavor droplets, which ultimately results in uniform samples. In one embodiment, dissolution of flavor in solvent, in a step separate from that of the dissolved prolamin, helps to produce flavor droplets of from between about 120 nm to about 2 μm in diameter in a core-and-shell formation. In another embodiment, the dissolution of flavor in a solvent produces flavor droplets of from between about 200 to about 600 nm. After dissolution in ethanolic solution, the flavor or flavor containing solution 16 can be combined in a mixing step 12, as described above.

In another embodiment, the present invention further comprises the step of sonicating 18 one or both of said flavor and/or prolamin solutions. While not intending to be limited by theory, it is believed that sonication breaks up aggregates and aids with achieving monomolecular dispersions, favoring self-assembly and encapsulation efficiency. In one embodiment, solutions are sonicated at 300 W for between about 2 and about 5 minutes. In one embodiment, sonicated solutions provide for droplet sizes of between about 100 to about 200 nm. In one embodiment, sonicated solutions provide for droplet sizes of about 120 nm in a core encapsulation formation. Embodiments comprising sonication 18 are followed by mixing steps 12, as described above in relation to FIG. 1, followed by drying.

The following studies and tests were performed to investigate the formation of self-assembled zein microspheres as core-and-shell systems for encapsulation of flavor oils. Self-assembly can be defined as a spontaneous process in which a disordered system of pre-existing components forms an organized structure or pattern as a consequence of specific, local interactions among the components themselves, without external direction or intervention. A zein and lime flavor core-and-shell encapsulation system was prepared by Evaporation-induced self-assembly (EISA). EISA is a technique used to induce self-organization of nanostructures. The fast evaporation of solvent drives the formation and organization of nano and microstructures. Samples of zein were obtained from Showa Sanyo Co. Ltd. (Tokyo, Japan), ethanol (190 proof) was obtained from Decon Labs, Inc., and lime flavor oil was obtained from International Flavors and Fragrances, Inc.

About 1 mg/ml of zein was dissolved in various solutions of ethanolic solvents ranging from about 60% to about 80% (v/v). In addition, about 0.8 to about 1.5 μl/ml of lime flavor was separately dissolved in said solutions of ethanol-water solvents. Both samples of flavor and prolamin solutions were sonicated. During test runs, samples of about 10 ml of dissolved zein and flavor solutions were placed on aluminum drying boats for solvent evaporation in forming self-assembled encapsulation structures. Samples were collected as powders and stored in incubators at room temperature.

After the EISA process, samples were evaluated using a number of analytical methods. Dry samples were gold coated (300 Å) using an Emitech K575 sputter coater to help improve electrical conductivity of sample surfaces in preparation for evaluation with a Scanning Electron Microscope (SEM). SEM images were obtained with a JEOL 6060LV General Purpose SEM. Dry samples with gold coating were also investigated by Focus Ion Beam (FIB) Microscopy. The dual-beam focused ion beam (DB-235 FIB, FEI Company) is a combination of a high resolution field emission SEM and a scanning metal ion beam microscope. A gallium (Ga) ion beam was used by the FIB to remove by etching the material on the sample surface in a controlled pattern. SEM images of sample cross sections were obtained by a preset side view detector after material removal. Samples were also prepared for FTIR Spectroscopy by placing a dash of EISA formed powders on polyethylene sample cards, manufactured by International Crystal Labs. A drop of 70% ethanol was placed to dissolve the prolamin shell and release the encapsulated lime flavor. FTIR spectra of the sample cards were collected (resolution 1 $cm^{-1}$, 64-scan summation) using a Thermo Nicolet FTIR spectrometer (Nexus 670). Finally, particle size characterization was also done by dynamic light scattering (DLS) both before and after combination of ethanol solution of zein and lime flavor. DLS measurements were taken with a NICOMP 380 ZLS particle sizer with a 20 mW diode laser beam at a wavelength of 635 nm. A scatter angle was held constant at 90°. Temperature was kept at 23° C. Count rates between 100 and 300 kilocounts per second were obtained by varying the sample concentration and adjusting the laser power.

Figure 3A:
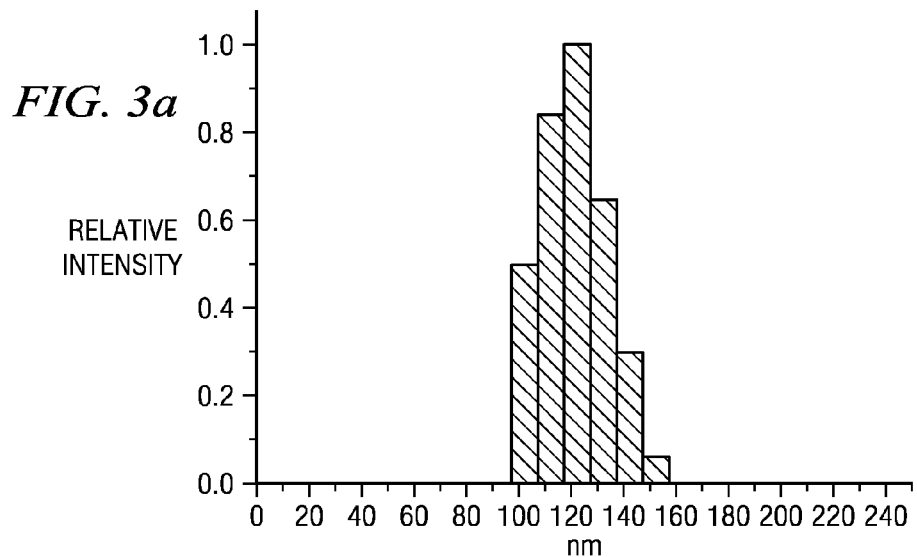
FIG. 3a is a chart depicting the particle size distribution for lime flavor droplets observed by DLS.
Figure 3B:
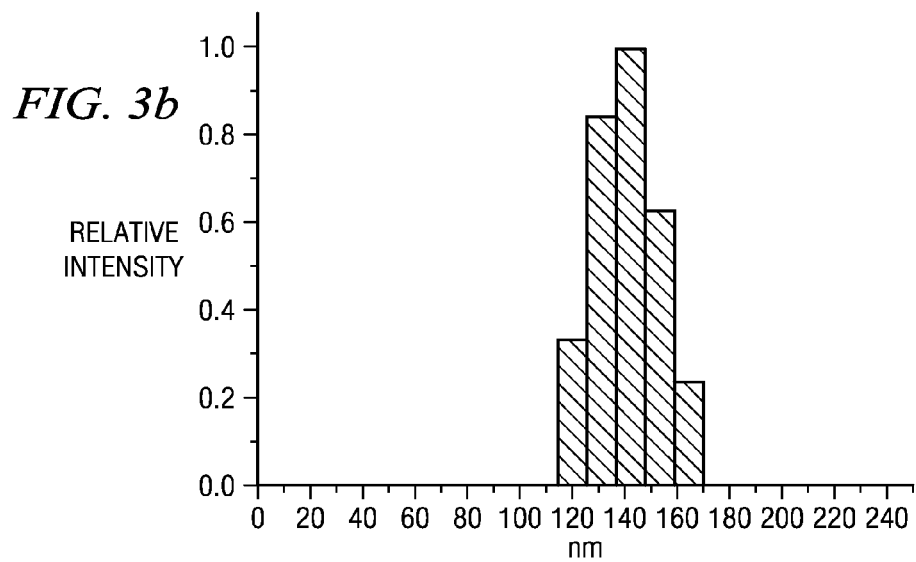
FIG. 3b is a chart depicting the particle size distribution for zein particles observed by DLS.
Figure 3C:
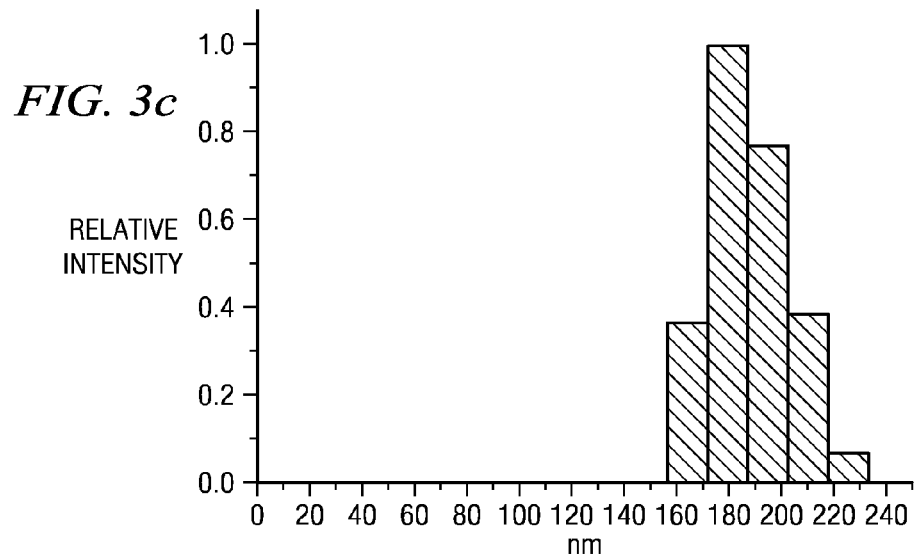
FIG. 3c is a chart the particle size distribution for zein-lime flavor particles observed by DLS.

After 2 minutes of 300 W sonication of lime flavor (limonene) mixtures in ethanol, droplets of about 120 nm were detected by DLS. After 2 minutes of 300 W sonication of zein solutions, particles of about 140 nm were detected. When zein and limonene were mixed together, particle sizes increased to about 180 nm. FIG. 3a shows the particle size distribution for lime flavor droplets observed by DLS. FIG. 3b shows the particle size distribution for zein particles observed by DLS. FIG. 3c shows the particle size distribution for zein-lime flavor particles observed by DLS.

Figure 4:
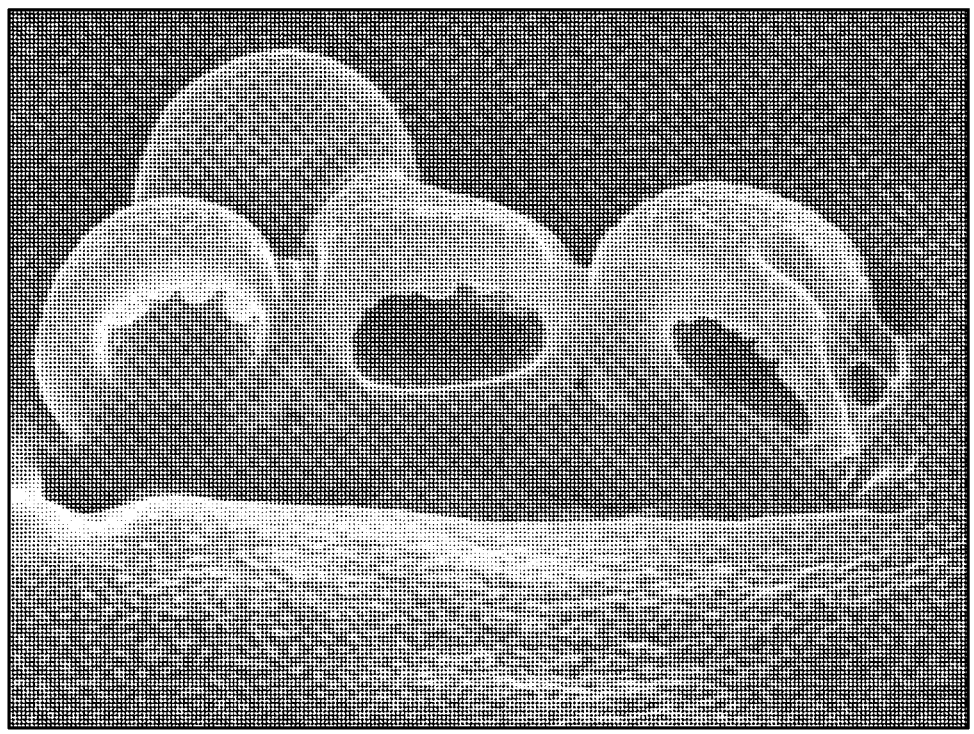
FIG. 4 shows an FIB image of the interior of zein spheres obtained by EISA from a solution containing 1 mg of zein/ml and about 0.75 µl lime flavor/ml 80% ethanol.
Figure 5A:
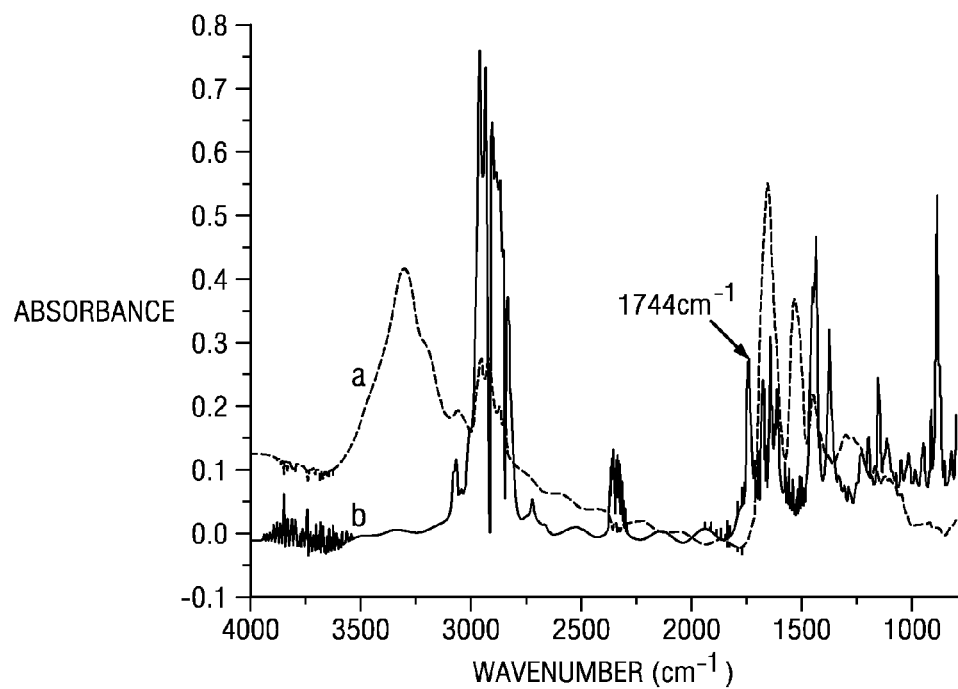
FIG. 5a shows the FTIR spectra of a) zein and b) lime flavor.
Figure 5B:
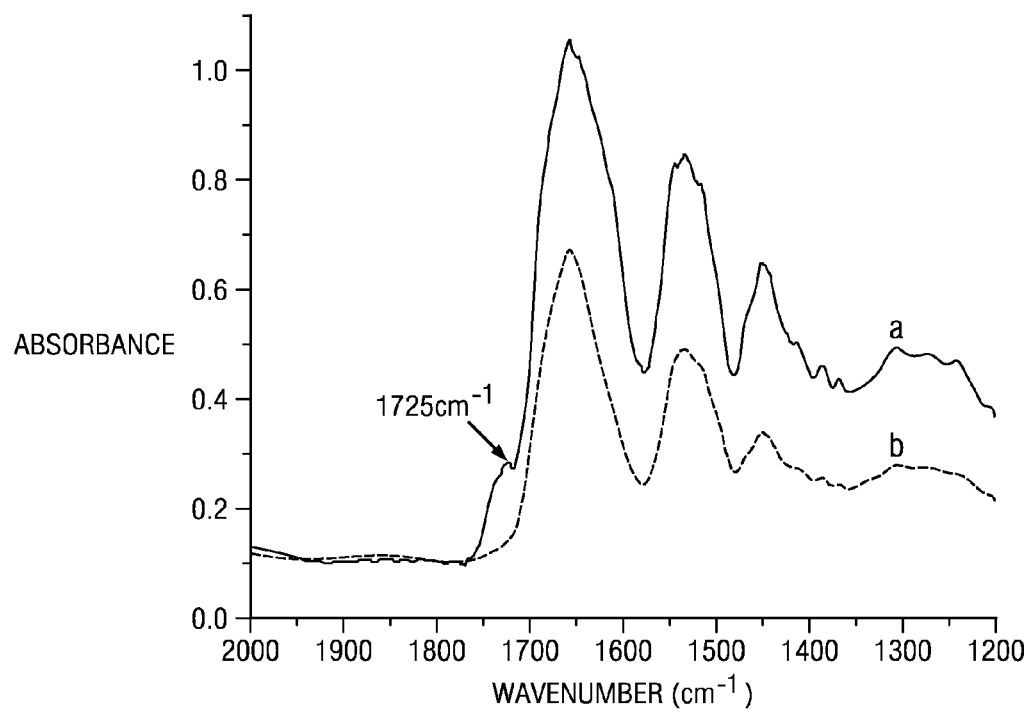
FIG. 5b shows the FTIR spectra of a) zein encapsulated lime flavor and b) zein.

Structures, as investigated by SEM and FIB, comprised spheres of about 0.5 to about 2 μm in diameter. The spheres appeared loosely attached to each other after drying. Clusters of zein spheres were randomly laid at the bottom of containers. FIG. 4 shows an FIB image of the interior of zein spheres obtained by EISA from a solution containing) mg of zein/ml and about 0.75 μl lime flavor/ml 80% ethanol, revealing a core-and-shell structure. The three zein core-and-shell spheres measured about 1 μm outer diameter and about 0.6 m inner diameter. Walls were about 0.2 μm in thickness. Lime flavor was believed to be encapsulated in the zein spheres taking the core space. Using FTIR spectra, the core material was proved to be lime flavor, namely the peak at 1725 cm-1, which corresponds to the ester carbonyl group, was used to identify the presence of lime flavor in the zein encapsulation system. FIG. 5a shows the FTIR spectra of a) zein and b) lime flavor. FIG. 5b shows the FTIR spectra of a) zein encapsulated lime flavor and b) zein. FIG. 5a shows that the peak at 1744 $cm^{-1}$ does not appear in the zein spectrum. This peak is attributed to ester carbonyl groups of lime. In FIG. 5b, the encapsulated sample at line a shows a peak at 1725 $cm^{-1}$, which is attributable to ester carbonyl groups, with a shift from the original 1744 $cm^{-1}$ peak, with no peak in the region 1800 to 1700 $cm^{-1}$ for the spectrum of zein.

During some test runs, zein spheres were obtained by EISA using varying concentrations of flavor from a solution containing 1 mg zein/ml, which were combined with: A) 0.5 μl lime flavor/ml 60% ethanol; B) 1.0 μl lime flavor/ml 60% ethanol; C) 2 μl lime flavor/ml 60% ethanol; D) 0.5 μl lime flavor/ml 70% ethanol; E1) 0.75 μl lime flavor/ml 70% ethanol; E2) 1 μl lime flavor/ml 70% ethanol; E3) 0.75 μl lime flavor/ml 80% ethanol; E4) 1 μl lime flavor/ml 80% ethanol; F) 1.5 μl lime flavor/ml 80% ethanol; G) 0.2 μl lime flavor/ml 90% ethanol; H) 0.75 μl lime flavor/ml 90% ethanol; I) 2 μl lime flavor/ml 90% ethanol. In FIB images of these structures, core-and-shell structures were found in the E sequence (e.g., E1, E2, E3 and E4). Data obtained suggested that core-and-shell formation occurs when lime flavor droplets are about 200 to about 600 nm in diameter. Core-and-shell spheres obtained after EISA were considerably larger at between about 1 to about 2 μm in diameter, than those obtained after mere mixing of zein and lime flavor solutions, as measured by DLS. This suggested that the self-assembly of zein shells may be mediated by EISA in some embodiments.

Returning to the discussion of FIG. 2, in a third embodiment for the encapsulation of flavors, the method of the present invention further comprises a two-phase drying process 20. As described above, drying steps of the present invention are performed following the mixing of a prolamin solution with the flavor or flavor-containing solution. The present invention presents an additional drying method, wherein the mixed solution comprising flavor and prolamin is dried using a two-phase drying process to form the powder comprising prolamin-encapsulated flavor. Such two-phase drying process comprises a first step for the removal of alcohol from the mixed solution, followed by a second step of water removal. In one embodiment, the two-phase drying process comprises a first step of subjecting the mixed solution to a mild drying method, followed by a second step of freeze-drying. In one embodiment, the mild drying step comprises drying the mixed solution under a hood at room temperature, thereby providing for the removal of alcohol from the mixture. In one embodiment, drying under a hood is performed for between about 4 to about 5 hours. Such drying may take place in aluminum foil pans, for example. Optionally, following drying in the hood, the drying may subsequently be performed in a vacuum oven to increase evaporation rates of the alcohol. For example, vacuum drying may take place at about 35 to about 45° C. and 300 Torr for between about 1 to about 2 hours. In the second phase of the drying process, freeze-drying methods remove water from the mixture. Said freeze drying may take place, for example at −70° C. and 100 m Torr (i.e., about 0.133 mbar, 13.3 Pascal, or 99.99% vacuum) for about 12 hours.

Without being constrained by theory, it is believed that the slow evaporation of alcohol, followed by removal of water better promotes formation of zein shells around flavor droplets to form a more organized core-and-shell encapsulation wherein the whole surface of a core particle is substantially covered with a coating composition containing a prolamin. In contrast, for example, where prior art methods rely on solvent and moisture removal with a quick or single evaporation or drying process, the present invention uses a two-phase drying process to provide for a more organized formation (i.e., a core and shell encapsulation), through which it is believed that the flavor remains more protected and substantially remains within a core-and-shell system.

Matrix-Assisted Concentration of Bioactive Components

Figure 6:
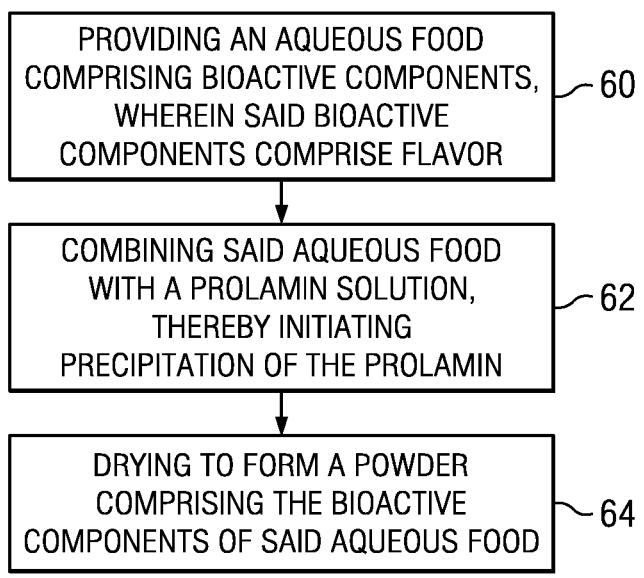
FIG. 6 depicts a flow chart of an improved embodiment over the overall method depicted in FIG. 1.

In an additional improved embodiment, depicted in FIG. 6, the present invention provides a simple and cost-effective method for the concentration and delivery of substantially all flavors or flavoring components, nutrients and other bioactive components of an aqueous food. In particular, it has been found that by providing an aqueous food 60 to be combined with a prolamin solution, not only are the flavors of the aqueous food encapsulated, but also substantially all of its bioactive components.

More specifically, the present invention provides an improved method for encapsulating flavors in which a prolamin solution is formed, a flavoring is mixed with the prolamin solution, and the mixed solution is dried to form a prolamin-encapsulated flavoring, wherein the improvements comprise the steps of: providing an aqueous food comprising bioactive components, wherein said bioactive components comprise flavor 60; and said mixing step comprises the combining of the prolamin solution with said aqueous food 62. The solution may then be subjected to drying methods to form a powder comprising the bioactive components of the aqueous food 64. Resulting free-flowing powder comprises substantially all the bioactive components of the aqueous food. In one embodiment, a powdered prolamin encapsulation comprising bioactive components of an aqueous food comprises between about 10% to about 99% prolamin by weight. In another embodiment, a powdered prolamin encapsulation comprising bioactive components of an aqueous food comprises between about 10% to about 90% prolamin by weight.

As used herein, an "aqueous food" is meant to refer to a water-based food source derived by natural or man-made processes. In one embodiment, the aqueous food substantially comprises a natural edible fluid or a fluid substantially derived from a natural source including without limitation plants, extracts, distillates, fluids or juices of fruits and/or vegetables. It is further preferred that the aqueous food be miscible with water. In one embodiment, the aqueous food is derived or manufactured using man-made methods. In one embodiment, the aqueous food may comprise man-made or manufactured components. In one embodiment, the aqueous food is a juice, fluid or liquid from an otherwise solid edible component. In one embodiment, the aqueous food comprises a fluid derived from a fruit, vegetable, botanical, dairy, animal or marine source. Further examples of suitable aqueous foods include without limitation extracts, distillates, processed and man-made formulations.

As used herein the term "bioactive components" is meant to refer to the non-water components of an aqueous food, including without limitation nutrients, phytochemicals, flavorants, tastants, and aromas as well as both volatile and non-volatile components of an aqueous food.

With reference to FIG. 6, providing an aqueous food comprising bioactive components 60 may comprise any method of obtaining the edible source including without limitation purchasing the aqueous food from a store or manufacturer or obtaining the aqueous food directly from a natural food source prior to combining it together with the prolamin solution. In one embodiment, the aqueous food is taken directly from a natural source such as that of a fruit or vegetable, for example. In one embodiment, the aqueous food is squeezed from a raw, unprocessed fruit. In one embodiment, the aqueous food is fresh. As used herein, the term "fresh" is meant to refer to an aqueous food substantially having its original, unimpaired qualities, including nutrients and other bioactive components. In one embodiment, the aqueous food may comprise enhanced or specialized extracts or distillates, which are capable of imparting fresh flavors and aromas. In one embodiment, the aqueous food comprises wholly distilled liquids. In one embodiment, the aqueous food is lime juice extracted directly from a lime. Further embodiments of the aqueous food comprise the juice or liquid extracted from oranges, lemons, grapefruits, key limes, citrons, clementines, mandarins, tangerines, and any other citrus fruit, or variation or hybrid thereof. In such embodiments, the combining step comprises squeezing its juices directly into the prolamin solution and may further comprise steps of cutting or exposing the core of a fruit or vegetable. In one embodiment, the aqueous food comprises liquids extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, strawberries, or any variation or hybrid thereof. In one embodiment, the aqueous food comprises liquids from one or more of such sources. In one embodiment, the aqueous food comprises a water content of between about 90% to about 99%. In another embodiment, the aqueous food comprises a water content of at least 80%.

In one embodiment, the aqueous food is dissolved in an aqueous alcohol solution prior to combining with a prolamin solution. In one embodiment, the aqueous food may be added to and dissolved in aqueous ethanol solutions. In some embodiments, an aqueous food may be dissolved in a solution comprising 100% ethanol. It is believed in particular that more complex flavors, including without limitation citrus fruits, for example, may benefit from such embodiments comprising alcohol solutions. In other embodiments comprising filtered juices, for example, the aqueous food may be combined directly into prolamin solutions.

Following the providing of an aqueous food 60, said aqueous food may be combined with a prolamin solution 62. A prolamin solution may be obtained as described above in relation to FIG. 1, whether concurrent or consecutive with providing step 60. As described above, a prolamin solution may be obtained, for example, by dissolving a prolamin in a solvent, using the methods described with reference to FIG. 1. Tables 3-5, shown above, list a number of solvents capable of dissolving a prolamin such as zein. At least one prolamin is dissolved in solvent containing varying concentrations of ethanol and water of from between about 60% to about 90% ethanol and about 10% to about 40% water. For use with the embodiment described herein, it remains preferable to use food grade solvents (such as compounds GRAS) that allow for the production of edible encapsulated flavorings including without limitation water, ethanol, propanol, butanol, isopropanol, isobutanol, acetic acid, lactic acid, acetone, ethyl acetate, benzyl alcohol, and any mixtures thereof. In one embodiment, the solvent for dissolving the prolamin comprises a binary solvent of ethanol and water. In one embodiment, the binary solvent comprises between about 60% and about 90% of an aqueous ethanol solution.

As described above, in some embodiments, the solvent may be heated prior to said dissolving step in order to ensure complete dissolution of the prolamin. Temperatures of about 120° F. have been found sufficient to completely dissolve the prolamin. Heat-labile components may be protected by cooling down heated solutions following dissolution to at least about 110° F. before the combining step 64. In one embodiment, the method may further comprise dissolution of the aqueous food in an alcohol solution 16 as described above in relation to FIG. 2. Similarly, in another embodiment, the method may comprise the step of sonicating one or both of the prolamin in solution and/or the aqueous food solution. As described above, sonicating at about 300 W for about 2 minutes has been found sufficient in some embodiments.

The combining step of the two liquid solutions 62 may comprise, for example, squeezing aqueous foods from a natural product, adding an aqueous food into a prolamin solution, or adding the prolamin solution to an aqueous food. Alternatively, in one embodiment, the combining step 62 may comprise the mixing or adding of the prolamin solution with the aqueous food in an alcohol solution.

Generally, the combining step may take place at room temperatures and/or at elevated temperatures of up to about 100° F. As used herein, "room temperature" may be any temperature in the range of approximately 64° F. to 71° F., wherein such temperature generally refers to the temperature of the surroundings in which the combining is carried out. This may include a controlled temperature inside a room, for example.

Following the combining step 62, a precipitation of the prolamin begins forming, initiating concentration of the bioactive, non-water components of the aqueous food within the prolamin. The combined solution and forming precipitate can thereafter be dried to form a dry free-flowing powder containing substantially all bioactive components of the aqueous food within a prolamin encapsulation. Without being bound by theory, it is believed that by embracing the water-insolubility of prolamins, the present invention provides for not only encapsulation of the flavor within an aqueous food, but also for methods for the concentration and encapsulation of the bioactive components of liquid foods comprising water. Thus, with the improved method, substantially all non-water components (including without limitation carbohydrates, sugars, acids, oils, solids and nutrients and flavoring components) of an aqueous food are concentrated and encapsulated with the assistance of the water-insoluble zein prolamin. As such, the present invention allows for the concentration of fruit juices and other aqueous foods by embedding their non-water bioactive components in a matrix using a prolamin such as zein. A loaded matrix can be separated from the liquid phase and then dried to a powder. In one embodiment, following the combining step 62, the combined solution may be further dried 64 by any means known in the art including without limitation vacuum drying or room drying. Preferably, however, said drying will occur under temperatures no greater than about 77 to 80° F. (25° C.). In one embodiment, the particles may be freeze-dried to render wholesome powders comprising substantially all the bioactive components of an aqueous food. In one embodiment, the combined solution 62 may be treated with liquid nitrogen in order to facilitate freeze-drying. In one embodiment, as described above with regard to FIG. 2, the present invention comprises a two-phase drying process wherein alcohol is first removed, followed by water removal. Thus, the solution may first be dried under a hood, followed by optional vacuum drying and then freeze-drying. This process assists in the formation of powder particles via a precipitation process that provides for the slow formation of a precipitate, while ensuring that the flavor is surrounded by the prolamin as it self-assembles. Resulting particles comprise a particle size of between about 10 microns to about 100 microns. In one embodiment, resulting dried particles comprise particle sizes of less than about 100 microns. In some embodiments, anti-caking agents such as silicon dioxide may be employed to prevent agglomeration of resulting powders. Alternatively, a dessicant may be used during storage.

Resulting encapsulated products comprise substantially all the non-water components of the aqueous food, including nutrients, phytochemicals, flavorants, tastants, and aromas. Thus, the prolamin encapsulation, in an improved embodiment, comprises substantially all flavors and nutrients of an aqueous food. Prolamin encapsulates of powdered, concentrated bioactive components may be topically applied to season snack food products including without limitation chips, bars, baked goods or fried foods.

In test runs, a zein prolamin was used to create a prolamin encapsulation of bioactive components from the natural juices of raw fruits including lime, orange, lemon, and cucumber.

Generally, for each test run, zein was added in varied solutions of aqueous ethanol. Ethanol solutions were stirred and heated to reach about 120° F. until sufficiently dissolving the zein and forming a zein solution. The zein solution was subsequently allowed to cool down to room temperature. Separately, about 30 ml samples of the juices were added together with the prolamin solutions and the combined solution was mixed together with the zein solution to make a final solution, which was poured out onto aluminum pans or plates for evaporation induced self-assembly of encapsulates and matrix entrapment structures. When ethanol was evaporated out, a concentrate or water suspension of zein encapsulated/entrapped juice components was formed. This suspension was then freeze-dried to a dry powder.

In another test run, about 30 ml of lime juice (about 92.2% water, 2.34 grams solids/30 ml juice) was added to varying solutions of zein at levels of about 150, about 300, and about 600 mg/30 ml of juice. Evaluation and comparison of the samples revealed zein concentration has an effect on the texture, flavor, and microstructures of the final products. Table 10, below, describes the evaluation of the final products. The ratio of flavor to zein in final products was about 2.4 grams of flavor to about 0.15 grams of zein and about 2.4 grams of flavor to about 0.6 grams of zein.

TABLE 10

Test runs evaluating zein concentrations.

| Zein Level (mg) | Texture | Flavor | Microstructure |
|---|---|---|---|
| 150 | gummy | sharp | film |
| 300 | dry | immediate | sphere |
| 600 | crystal | less immediate | flake |

Panel Testing of the Powdered Concentrates

A descriptive panel of 12 members was put together to taste and characterize processed lime juice to determine flavor authenticity and establish flavor differences among samples prepared by conventional processes as well samples prepared by the method of the present invention. Lime juice crystals manufactured using different processes were applied to potato chips which were then ground using an electric coffee mill.

Under the guidance of a panel leader, the panel characterized the flavor of the following samples prepared by three different processes: 1) dry lime juice made from the matrix-assisted process of the present invention (6% wt/wt) (matrix sample); 2) dry lime juice prepared using a conventional spray drying process having a low acid content of 6.1% (6% wt/wt) (high pH sample); and 3) dry lime juice prepared using a conventional spray drying process having an acid content of 12.2% (6% wt/wt) (low pH sample). Sample 4 consisted of a "fresh" sample of potato chips with fresh lime juice (diluted to 70% with distilled water) topically applied (10% wt/wt) and then allowed to dry, which was evaluated as a control. While sample 1 was prepared using methods disclosed herein, samples 2) and 3) were prepared using traditional spray drying processes, with the high pH sample dried on Maltodextrin (>50% Maltodextrin, 1-10% lime juice solids and 1-10% natural flavors) and the low pH sample dried on corn syrup solids (>50% corn syrup solids, 10-25% natural flavors (10-25% lime juice solids and 1-10% natural flavors). Comparable samples prepared by traditional spray drying processes can be obtained from Firmenich, for example.

Initial flavor characteristics were described as fresh lime flavor, sweet, sour, bitter and astringent. The panel members were then presented with substances which characterized those flavors (e.g., caffeine=bitter). Panelists then revised the flavor characteristics deleting "sweet" and including "synthetic lime" as represented by citral. Panelists then established concentrations for the standards for the identified taste attributes, as shown below in Table 11.

TABLE 11

Standards and scale values used for sensory evaluation

| Characteristic | Standard | Scale value |
|---|---|---|
| Fresh lime | Fresh lime juice (70%) applied to chips and air dried | 12.2 |
| Sweet | 10% sucrose | Deleted |
| Synthetic lime | 0.1% citral | 8.0 |
| Sour | 0.1% citric acid solution | 10.4 |
| Bitter | 0.02% caffeine solution | 8.0 |
| Astringent | 0.02% tannin solution | 8.0 |

Panelists were then trained during three 1-hour sessions to evaluate products using these standards using a 17 cm semi-structured line scale (ranging between "none" and "intense" hash marks as shown in FIG. 7) to evaluate intensity. FIG. 7 depicts the sensory scale used for the evaluation of the different intensities of each characteristic, with arrows depicted at each scale value indicated in Table 11. It should be noted that FIG. 7 is not drawn to scale. Panelists scored each sample for each characteristic on the line scale relative to that standard. For sample evaluation, samples were coded with 3-digit random numbers and presented to panelists in random order. Data were collected by measuring the distance from the 0 end to panelist's mark in centimeters. Panelists were provided with distilled water and unsalted soda crackers to cleanse the palate between samples. Each panelist evaluated each sample 3 times with a 5 min rest between sets.

Statistical Analyses:

Data were subjected to Analysis of Variance for panelists by treatment interactions. Based on performance of each individual panelist, data from 3 panelists was deleted in its entirety based on lack of internal consistency of these panelists. Least squares means and standard deviations were calculated using the data from the 9 remaining panelists. Means for characteristics that differed due to treatment were separated using Fisher's Protected LSD values.

Results

Figure 8:
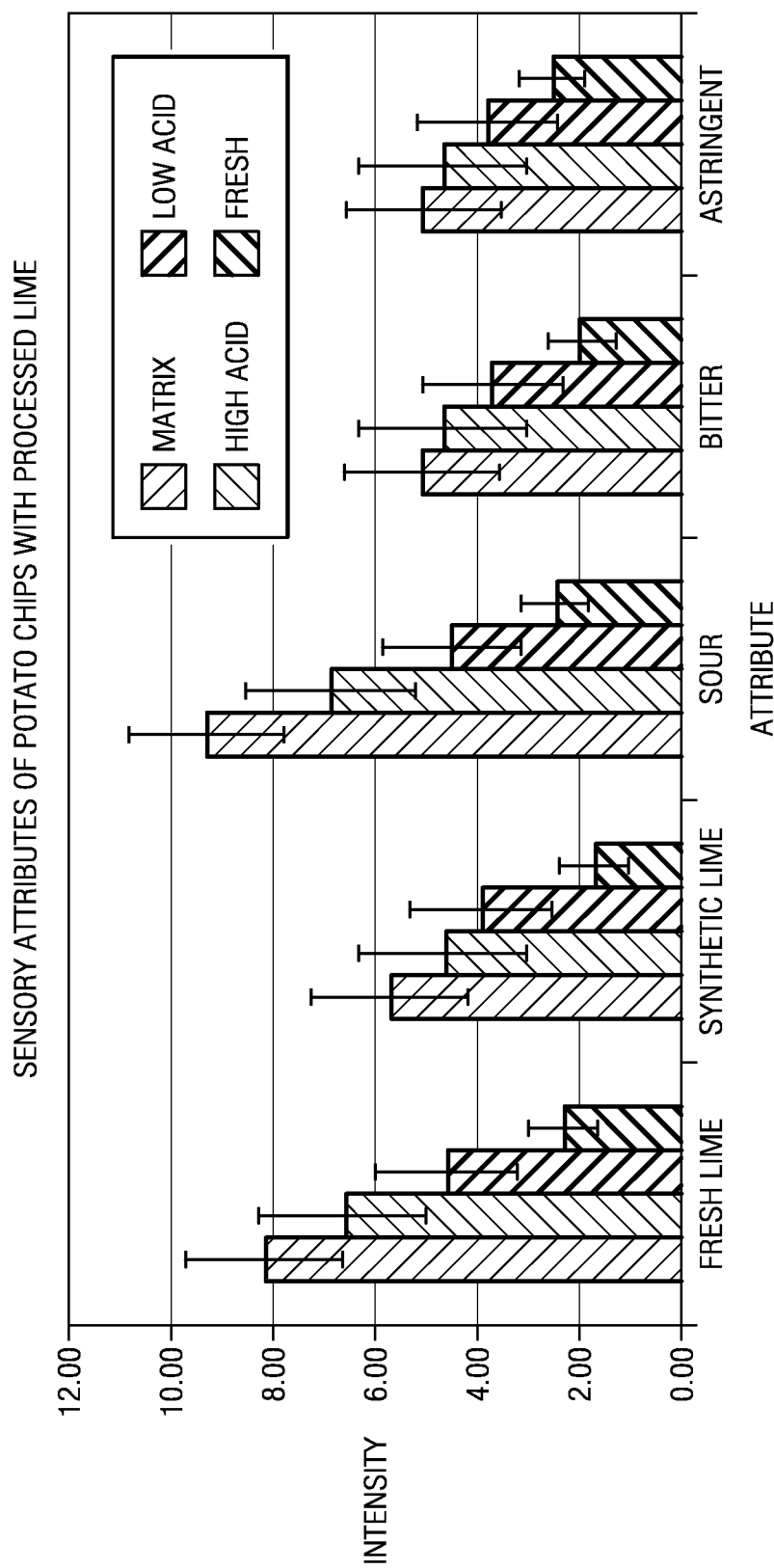
FIG. 8 is a chart illustrating the sensory attributes of potato chips with topically applied powdered lime products.

Means and standard deviations for the sensory characteristics of the four products (matrix-assisted process, high-pH conventional process, low-pH conventional process, and potato chips with fresh lime juice (70%) applied and dried) are shown in Table 12 and FIG. 8.

TABLE 12

Means and standard deviations for sensory characteristics of powdered lime product on potato chips

| | Sensory characteristic | | | | |
|---|---|---|---|---|---|
| Treatment | Fresh Lime Flavor | Synthetic Lime Flavor | Sour Flavor | Bitter Flavor | Astringent Flavor |
| Matrix | 7.87 ± 1.74$^a$ | 5.82 ± 1.07$^a$ | 8.96 ± 1.64$^a$ | 4.62 1.63$^a$ | 4.78 ± 1.54$^a$ |
| High Acid | 6.43 ± 1.92$^b$ | 4.63 ± 1.35$^b$ | 6.87 ± 1.97$^b$ | 4.27 1.75$^a$ | 4.53 ± 1.19$^{ab}$ |
| Low Acid | 4.65 ± 1.43$^c$ | 3.88 ± 1.31$^b$ | 4.31 ± 1.66$^c$ | 3.61 1.47$^a$ | 3.79 ± 1.02$^b$ |
| Fresh | 2.02 ± 0.65$^d$ | 1.71 ± 0.64$^c$ | 1.99 ± 0.70$^d$ | 1.79 ± 0.62$^b$ | 2.31 ± 0.71$^c$ |

$^{a,b,c,d}$Means in a column with like superscript letters do not differ

The dry lime juice from the matrix-assisted method of the present invention had the most intense lime flavor of all the treatments. It was also most similar to the synthetic lime flavor (citral), however the high and low acid conventional products did not differ (Table 11 and FIG. 8). The matrix-assisted product was significantly more sour than either of the conventional treatments however it did not differ in bitter flavor and did not differ from the high-acid conventional product in astringent flavor.

CONCLUSION

If we consider that both types of lime flavor (fresh on a potato chip and citral) and sour flavor are the desirable flavor characteristics for a lime product and bitter and astringent are less desirable, from this data, the matrix-assisted product is an improvement over the high-acid and low-acid conventional product, in terms of lime flavor, without the often-associated bitterness and astringency.

The present invention comprises a number of advantages and benefits over the state of the art. First, the method provides for natural, clean-label snack food products comprising natural flavors, which are delicate yet unique and otherwise difficult to equal. Second, the method for extraction and concentration of the bioactive, non-water components of aqueous foods provides for desirable and in-demand methods of providing a delivery method for "from the named source" (FTNS) flavors. As known in the industry, these flavors consist only of extracts or distillates taken from a given (or named) food. The present invention provides for delivery of FTNS flavors on a natural platform (prolamines), without the need for multiple specialized entities and multiple specialized technologies for producing a desired flavor. Such methods are increasingly desirable to those consumers who desire more clean-labeled, or natural labeling, on snack foods. Third, the present invention produces products that reflect the character of the original, fresh or natural food in a highly concentrated flavor entrapment process, which is fairly simple and direct. Artificial extracts do not, as a rule, possess the delicacy of flavors made in nature. Consequently, the method produces and delivers authentic flavorings from natural foods, with a taste equal to that of the starting aqueous food. Fourth, the method concentrates the nutrients of an aqueous food system. Thus, nutrients made in nature can be delivered using a simple method. In particular, natural fruit juices can be rendered into wholesome powders containing virtually all flavors and nutritional components of the original juice.

Finally, the present invention is also an improvement over current commercial concentration processes. Most commercial concentration processes utilize evaporation techniques to remove the bulk of the water from the juice. However, it is widely recognized that evaporation techniques result in the undesired removal or loss of volatile aroma and flavor compounds along with water, thereby resulting in a significant deterioration in quality and overall aroma and flavor of the concentrated juice. There is also the possibility that the present invention prevents not only evaporation losses but also loss or deformation of flavors by chemical or enzymatic reaction between juice components. Numerous methods have been devised to compensate for the loss of aroma and flavor during evaporation concentration processes. However, these procedures are not totally satisfactory because only a fraction of the escaping aroma and flavor volatile compounds can be collected and recovered. Thus, there is necessarily a net loss in overall aroma and flavor of the final concentrated product. While evaporation concentration processes are useful and fairly effective, there is still a significant loss of aroma and flavor compounds which occurs. Other methods for concentrating involve freeze concentration, in which the objective is to remove water in the form of ice crystals. However, even using these methods, there are losses of volatile aroma and flavor compounds. The present invention provides for trapping flavor and aroma compounds and effectively preventing them from being lost by evaporation. In addition, as discussed above, other nutrients of an aqueous food may also be concentrated.

The invention illustratively disclosed herein suitably may be practiced in the absence of any element which is not specifically disclosed herein. In some embodiments, the present invention may suitably comprise, consist of, or consist essentially of, the steps of obtaining an appropriate prolamin solution and combining the prolamin solution together with an aqueous food product. Individual numerical values and/or ranges are stated as approximations as though the values were preceded by the word "about" or "approximately." As used herein, the terms "about" and "approximately" when referring to a numerical value shall have their plain and ordinary meanings to a person of ordinary skill in the art to which the disclosed subject matter is most closely related or the art relevant to the range or element at issue.

What is claimed is:

1. An improved method for encapsulating flavors in which a prolamin is dissolved to form a prolamin solution, a flavor is mixed with the prolamin solution to form a mixed solution, and the mixed solution is dried to form a powder comprising prolamin-encapsulated flavor, wherein the improvements comprise:

prior to said mixing step, dispersing an aqueous food in an alcohol solution by sonicating the solution, wherein said aqueous food comprises bioactive components, wherein said bioactive components comprise said flavor; and wherein said mixing step comprises combining said aqueous food with said prolamin solution, thereby initiating concentration of said bioactive components of said aqueous food, said prolamin-encapsulated flavor further comprising said bioactive components.

2. The method of claim 1 wherein said prolamin comprises zein.

3. The method of claim 1 wherein said aqueous food comprises juice.

4. The method of claim 1 wherein said aqueous food comprises a fluid derived from a fruit.

5. The method of claim 1 wherein said aqueous food comprises a fluid derived from the group consisting of fruit, vegetable, botanical, dairy, animal, and marine source.

6. The method of claim 1 wherein said aqueous food is dispersed in a solution comprising 100% ethanol.

7. The method of claim 1 wherein said prolamin solution comprises no more than 40% water.

8. The method of claim 1 wherein said prolamin solution comprises a temperature of at least 100° F. before said combining with said aqueous food.

9. The method of claim 1 wherein said aqueous food is derived from a natural source selected from the group consisting of lime, cucumber, lemon and orange.

10. The method of claim 1 wherein the drying step comprises a two-phase drying process, wherein said process comprises evaporation of alcohol, followed by freeze-drying.

11. The method of claim 1 wherein said powder comprising prolamin-encapsulated flavor comprises particles of less than about 100 microns.

12. The method of claim 1 further comprising the step of applying said powder of prolamin-encapsulated flavor comprising said bioactive components onto a food product.

13. The prolamin encapsulation produced by the method of claim 1.

* * * * *